July 7, 1931.  E. F. GAINES  1,812,942
PROCESS OF CLEANING POWER MEAT SAWS
Filed Feb. 9, 1929  2 Sheets-Sheet 1
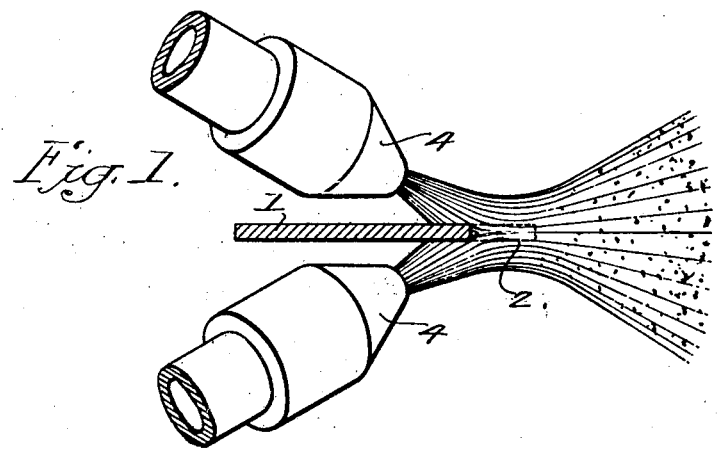
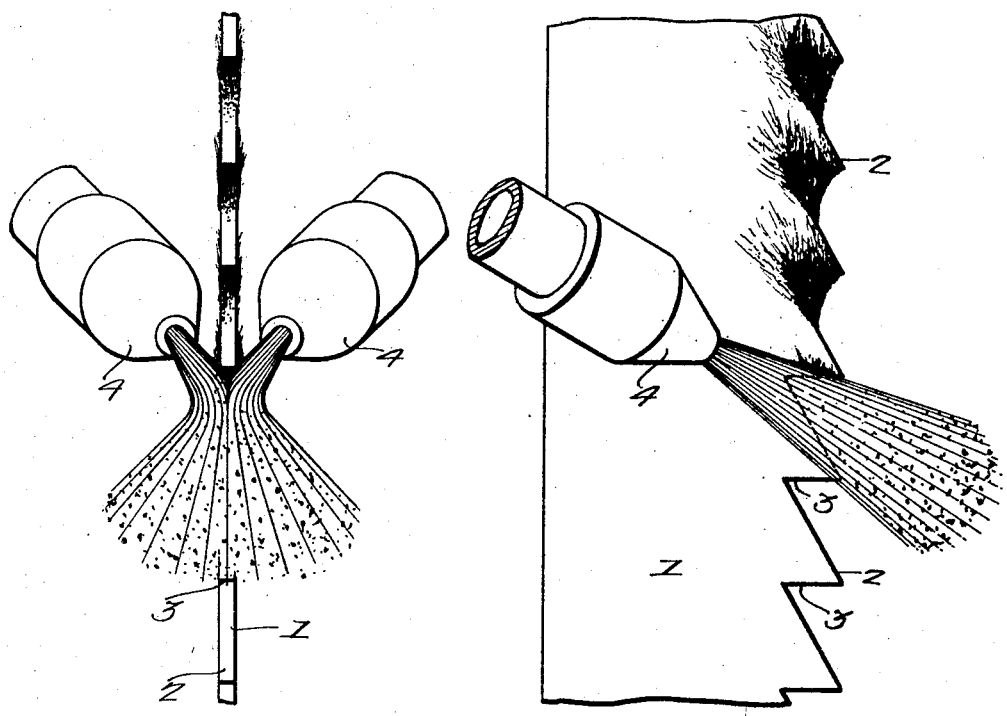
Inventor:—
Eugene F. Gaines.
by his Attorneys, July 7, 1931.  E. F. GAINES  1,812,942
PROCESS OF CLEANING POWER MEAT SAWS
Filed Feb. 9, 1929   2 Sheets-Sheet 2
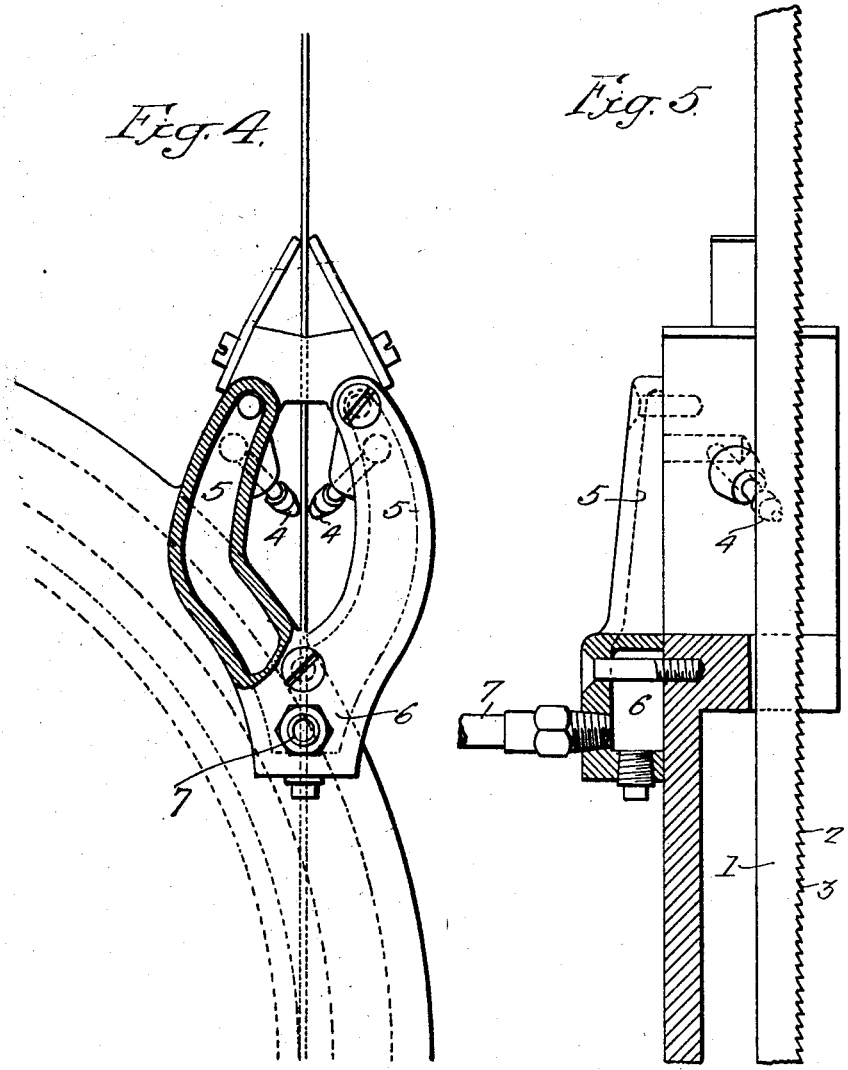

Patented July 7, 1931

1,812,942

UNITED STATES PATENT OFFICE

EUGENE F. GAINES, OF PHILADELPHIA, PENNSYLVANIA, ASSIGNOR TO ATLAS MANUFACTURING COMPANY, OF PHILADELPHIA, PENNSYLVANIA, A CORPORATION OF DELAWARE

PROCESS OF CLEANING POWER MEAT SAWS

Application filed February 9, 1929. Serial No. 338,848.

One object of my invention is to improve the method of removing adhering material from the gullets of saws, and particularly band-saws, used in cutting meat and like material.

A further object of the invention is to improve the method of cutting meat by a band-saw, so that when the meat is cut the surface will be free of adhering films of fat and gristle and also free of bone dust.

Prior to my invention meat was cut by power-driven saws, but the product was not satisfactory, as no effective means was provided for removing the adhering material, such as gristle, fat and small bones, from the gullets between the teeth of the saws. This material, due to the action of the saw in passing through the meat, is packed into the gullets of the saw, and as it is of a sticky nature it adheres thereto and the stringy ends are also pressed against the sides of the saw, and unless this material is entirely removed, not only from the sides of the saw but also from the gullets between the teeth, the saw, as it passes through the meat, deposits a certain amount of this adhesive material on the freshly cut faces of the meat, making the cuts very unattractive and in fact unsalable, unless this material is removed from the surface of the meat by hand, which is a rather difficult matter, as the material has been pressed into the surface of the meat by the action of the saw.

By my invention the saw is cleared of any adhering material immediately after it has passed through the meat, so that when that portion of the saw makes another cut it is free of any adhering material; consequently, the cut surfaces of the meat are clean and attractive and salable without further handling.

In the accompanying drawings:

Fig. 1 is a sectional diagrammatic plan view illustrating my improved method of removing adhering material from the gullets of power saws used in cutting meat;

Fig. 2 is a diagrammatic side view;

Fig. 3 is a diagrammatic edge view of a band-saw and the air nozles on either side of the saw;

Fig. 4 illustrates one form of apparatus for use in removing the adhering material from the gullets of band-saws used in cutting meat; and Fig. 5 is a sectional view through the apparatus of Fig. 4 in the general plane of the saw.

In this application I have not illustrated a complete power-driven band-saw for cutting meat, as the invention relates solely to the method by which the adhering material is removed from the gullets of the teeth of the band-saw.

In the drawings, the saw blade 1 is a band-saw blade, having teeth 2 of any suitable shape, and between the teeth are gullets 3. Ordinarily, the chips removed by the teeth of the saw accumulate in the gullets and fall away as soon as that portion of the saw passes through the lumber or like material, but the cutting of meat is an entirely different proposition, and when a cut is made the sticky fats, sinews, meats, and very small particles of bone are packed into the gullets and cannot be removed by the ordinary means, as considerable pressure must be used to dislodge the material.

I have found, after a number of experiments, that the only effective and practical method of removing the adhering material is to project a blast of air from a nozzle directly into each gullet of the saw, the nozzle being located back of the gullet and preferably at the angle shown, so that the entire force of air will be concentrated upon the material at the base of the gullet. This force will remove the material bodily from the gullet and will take with it all stringy fibres that are attached thereto and which adhere to the sides of the saw. Air blasts from two nozzles 4—4 are preferably used. The nozzles 4—4 are arranged at an angle in respect to the saw and are preferably inclined as shown. These nozzles are of any suitable type and the force of air is such that the sides of the saw are cleaned and the material forcibly removed from the gullets. It will be noted that the nozzles 4—4 concentrate directly upon the inner end gullet and the resultant of the air streams emitted thereby is a stream moving in the general direction of the bisector of the gullet at the time the gullet is passing the nozzles. It will also be noted that air passing from these nozzles moves over the tooth edges defining the gullet from the apex of the gullet to the outer ends thereof so that there is no tendency of the stringy fibres hereinbefore mentioned to wrap about these edges and thus cling to the saw as it moves from the line of passage of the air streams.

In the illustrated example of my invention the blast of fluid passes to substantial extent in the direction of travel of the saw teeth. As indicated, the blast of fluid may pass in the general direction of the bisector of the gullet between neighboring teeth at the time of passage through the blast. Furthermore, the fluid blast may, as indicated, pass over the tooth edges defining the gullet, from the apex of the gullet to the outer ends thereof, whereby the tendency of fibers to wrap about the edges and cling to the saw is overcome.

In general in accordance with my invention, the fluid jet passes in a direction having a component normal to the face of the saw and a component parallel to the face of the saw from the rear toward its cutting edge; and the jet forcibly impinges at and adjacent the bottom of the gullet as it passes the fluid blast, which continues outwardly beyond the toothed edge of the saw.

In the illustrated example the teeth incline forwardly in the direction of movement of the saw blade, and the fluid jet passes generally in the direction of inclination of the teeth or in the direction of movement of the teeth. As hereinbefore indicated, however, the teeth may be of any suitable type. My invention will be understood not to be limited to all aspects of the example illustrated.

In general the jet or blast of air or equivalent fluid forces the adherent material out of the gullets and projects or carries it away from the saw to any suitable receptacle. By preference, jets are produced on opposite sides of the saw blade more effectively to remove the adherent material.

This method has proved to be entirely satisfactory, and meat cut with a saw using this method of cleaning is free of surface films and small particles of bone.

In Figs. 4 and 5 I have shown one form of apparatus for carrying out my improved process. The nozzles 4 are attached to arms 5—5 of an air box 6 to which an air pipe 7 is attached. This pipe leads from a suitable air pressure pump of any suitable type to produce the pressure desired.

While I have described my invention in connection with the cutting of meat, it will be understood that the process may be used in removing other adhering material from the gullets of saws that has substantially the same character as meat.

In my co-pending application Serial No. 490,500, filed October 22, 1930, are claimed mechanism for performing the method herein disclosed, and subject matter not herein disclosed or claimed.

I claim:—

1. The method hereindescribed of removing adhering material from the gullets of meat saws, said method consisting in causing the saw after it has cut the meat to pass two concentrated blasts of air projected toward the toothed edge thereof at an angle to the face of the saw and at the back of the line of teeth and at an incline thereto in the direction of travel of the teeth, so that the adhering material will be forced from the gullets between the teeth and the side of the saw near the cutting edge will be cleaned by the air blasts.

2. The method of removing adhering material from the gullets of meat saws consisting in passing the saw, after it has cut the meat, between two converging blasts of air which concentrate upon the gullets as they pass thereby, are directed in substantially the same direction as the bisector of the gullet and move from the inner end of the gullet to the mouth thereof, and combine to form a stream moving in the general plane of the saw.

3. In the art of sawing meat, the method of freeing the saw of material adhering thereto, which comprises applying thereto, during operation thereof after passing through the meat, a free jet of fluid forcibly impinging at and adjacent the bottoms of the gullets and whose direction of movement has a component normal to the face of the saw, and a component parallel to the face of the saw from the rear toward and continuing beyond its cutting edge, thereby projecting said material from the saw.

4. In the art of sawing meat, the method of removing fibers lodged in the gullets of and clinging to the faces of a meat saw, which comprises applying a free jet of fluid against the face of the saw at an angle other than normal thereto and whose direction of movement has a component substantially parallel to the face of the saw and moving from the rear toward the toothed edge, said jet forcibly impinging at and adjacent the bottoms of the gullets and continuing beyond said toothed edge to release the clinging ends of fibers from the faces of the saw and to project the fibers from the gullets.

5. In the art of sawing meat, the method of removing adherent material from the saw blade having teeth inclined generally in the direction of movement of said blade, which comprises applying, during operation of the saw and after its passage through the meat, a free jet of fluid forcibly impinging at and adjacent the bottoms of the gullets and continuing outwardly beyond the toothed edge of the blade, and whose direction of movement has a component normal to the face of the saw, a component parallel to the face of the saw from the rear towards its cutting edge, and a component generally parallel to the inclination of the saw teeth as they pass the jet, thereby removing adherent material from the saw.

EUGENE F. GAINES.